(12) United States Patent
Cherukumudi et al.

(10) Patent No.: US 8,931,036 B1
(45) Date of Patent: Jan. 6, 2015

(54) TRANSFORMATION OF EXTENSIBLE MARKUP LANGUAGE DOCUMENTS FOR WEB SERVICES CUSTOMIZATION

(75) Inventors: Vijaykumar Cherukumudi, Overland Park, KS (US); David K. Fultz, Raymore, MO (US); Richard A. Rofail, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 508 days.

(21) Appl. No.: 12/975,762

(22) Filed: Dec. 22, 2010

(51) Int. Cl.
*G06F 21/00* (2013.01)
*H04L 29/06* (2006.01)
*G06F 21/62* (2013.01)

(52) U.S. Cl.
CPC ............ *H04L 63/20* (2013.01); *H04L 63/102* (2013.01); *G06F 21/6227* (2013.01)
USPC .............. 726/1; 726/12; 709/225; 709/226

(58) Field of Classification Search
CPC .... H04L 63/20; H04L 63/102; G06F 21/6227
USPC .............. 726/1, 12; 709/225, 226
See application file for complete search history.

(56) References Cited

U.S. PATENT DOCUMENTS

| | | | |
|---|---|---|---|
| 7,711,832 B1 * | 5/2010 | Champion et al. ............ 709/228 |
| 2006/0075465 A1 * | 4/2006 | Ramanathan et al. ............ 726/1 |
| 2006/0195546 A1 * | 8/2006 | Hulse et al. .................... 709/217 |
| 2007/0150574 A1 * | 6/2007 | Mallal et al. ................... 709/223 |

* cited by examiner

*Primary Examiner* — Jung Kim
*Assistant Examiner* — Thomas Ho (57) ABSTRACT

A system is provided comprising at least one processor, a memory, and an application stored in the memory that, when executed, receives a first request from a client device for access to a first web service and accesses a policy associated with the first web service. The system also selects a second plurality of data elements from a first plurality of data elements based on the first request and based on the policy wherein the second plurality of data elements is associated with the first web service. The system also provides the second plurality of data elements to the client device and receives a second request from the client device for a first set of data values associated with the second plurality of data elements. The system also authenticates the second request and provides the first set of data values in response to the second request.

18 Claims, 4 Drawing Sheets

TRANSFORMATION OF EXTENSIBLE MARKUP LANGUAGE DOCUMENTS FOR WEB SERVICES CUSTOMIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A web service is a software component that may make services available over the internet. Web services may use a standardized extensible markup language (XML) messaging system that is used to encode communications to a web service. Web services provide a standard means of interoperating between different software applications, running on a variety of platforms and/or frameworks. Web Services are self-contained, modular, distributed, dynamic applications. Web services typically provide application programming interfaces (API) or a defined set of hypertext transfer protocol (HTTP) request messages along with a definition of the structure of response messages that are accessed and executed on a remote system hosting the requested services. Web services may manipulate extensible markup language (XML) representations of web resources provided by web servers. Data elements may be provided by web services and may be described by schema that provide specifications for the use and representation of the data elements in various applications. Web services may employ reusable application components and may promote exchange of data between different applications and different computing platforms. Web services may help to solve interoperability problems by giving different applications various means to link their data.

SUMMARY

In an embodiment, a schema filtering system is provided. The system comprises at least one processor, a memory, and an application stored in the memory that, when executed by the processor and receives a first request from a client device for access to a first web service. The system also accesses a policy associated with the first web service. The system also selects a second plurality of data elements from a first plurality of data elements based on the first request and based on the policy wherein the second plurality of data elements is associated with the first web service. The system also provides the second plurality of data elements to the client device and receives a second request from the client device for a first set of data values associated with the second plurality of data elements. The system also authenticates the second request and provides the first set of data values in response to the second request.

In an embodiment, a processor-implemented method is provided. The method comprises a filtering server receiving a request for access to at least one of a plurality of web services wherein the plurality of web services are associated with a first plurality of data elements. The method also comprises the filtering server accessing a filtering rule associated with a policy, the policy describing access to the first plurality of data elements. The method also comprises the filtering server applying the filtering rule to filter a second plurality of data elements from the first plurality of data elements, the second plurality of data elements associated with the at least one web service. The method also comprises the filtering server providing the second plurality of data elements in response to the request, the second plurality of data elements provided in a schema definition.

In an embodiment, a processor-implemented method is provided. The method comprises a filtering server receiving a request for data values associated with data elements described in a first schema definition, wherein the first schema definition is one of included in the request and referenced in the request. The method also comprises the filtering server authenticating the request, wherein authentication comprises processing at least one of the privileges and access rights of the requester of the data values. The method also comprises the filtering server validating the first schema definition, wherein validation comprises determining that the first schema definition is in compliance with a second schema definition previously provided under a policy. The method also comprises the filtering server providing the data values requested in the first message.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods that permit an organization to provide data elements to customers in customized schema definitions for web services. The data elements are filtered from a master file of data elements in accordance with policies regarding authorized access to the data elements. The customized schema definition provided to the customer may be compliant with the web service definition language (WSDL). The customer may use the schema definition to create various electronic documents for use in periodically requesting data values associated with the data elements described in the schema definition. The organization may provide an interface promoting exchange of transmissions with the customer related to the contracted web services wherein the transmissions reference the schema definition and are based on the simple object access protocol (SOAP).

A large organization, for example a telecommunications service provider, may selectively provide web services to a plurality of internal and external customers. The customer receiving access to a web service may initially involve the customer being provided a schema definition describing the data elements the customer may need for the web service. Constructing the schema definition for the customer may initially include accessing stores of data elements and schema parameters broader than are needed to provide the individually requested web services. An encompassing or robust application programming interface (API) associated with the organization's web services may expose a volume of information and associated level of detail beyond a web service customer's needs or access privileges. The present disclosure teaches the application of policies using the extensible stylesheet language transformations (XSLT) language to transform a large body of data elements and associated schema parameters to a more limited and confined group aligned with the customer's needs as well as privilege level. The limited group of data elements is provided to the customer in a schema definition. The schema definition permits the customer to access needed data values associated with the data elements described but prevents the customer from accessing other data elements and values to which the customer is not permitted access or may not need.

The present disclosure teaches the effective filtering of data elements and schema parameters described in a broad or encompassing application programming interface (API) associated with a plurality of web services. The filtering may be described by at least one policy applicable to the requested web service and may be specific to a particular customer or segment of customers. The policy is applied by an extensible stylesheet language transformations (XSLT) language script or routine designated by the policy. The script or routine transforms a master document containing the organization's large population of data elements and schema details to a more confined document containing fewer and more defined data elements. The master document is effectively filtered or transformed to the limited and customized schema definition for the customer's periodic use. Thereafter, when the customer may periodically request data values associated with its contracted web service, the schema definition contained in or referenced by the customer's various simple object access protocol (SOAP) documents may be validated by the organization. The validation may assure that the schema definition describing data elements and their parameters as requested in the customer's simple object access protocol (SOAP) documents complies with the schema description provided earlier to the customer. This protects the integrity of the organization's data elements and the confidentiality of its various data stores.

Figure 1:
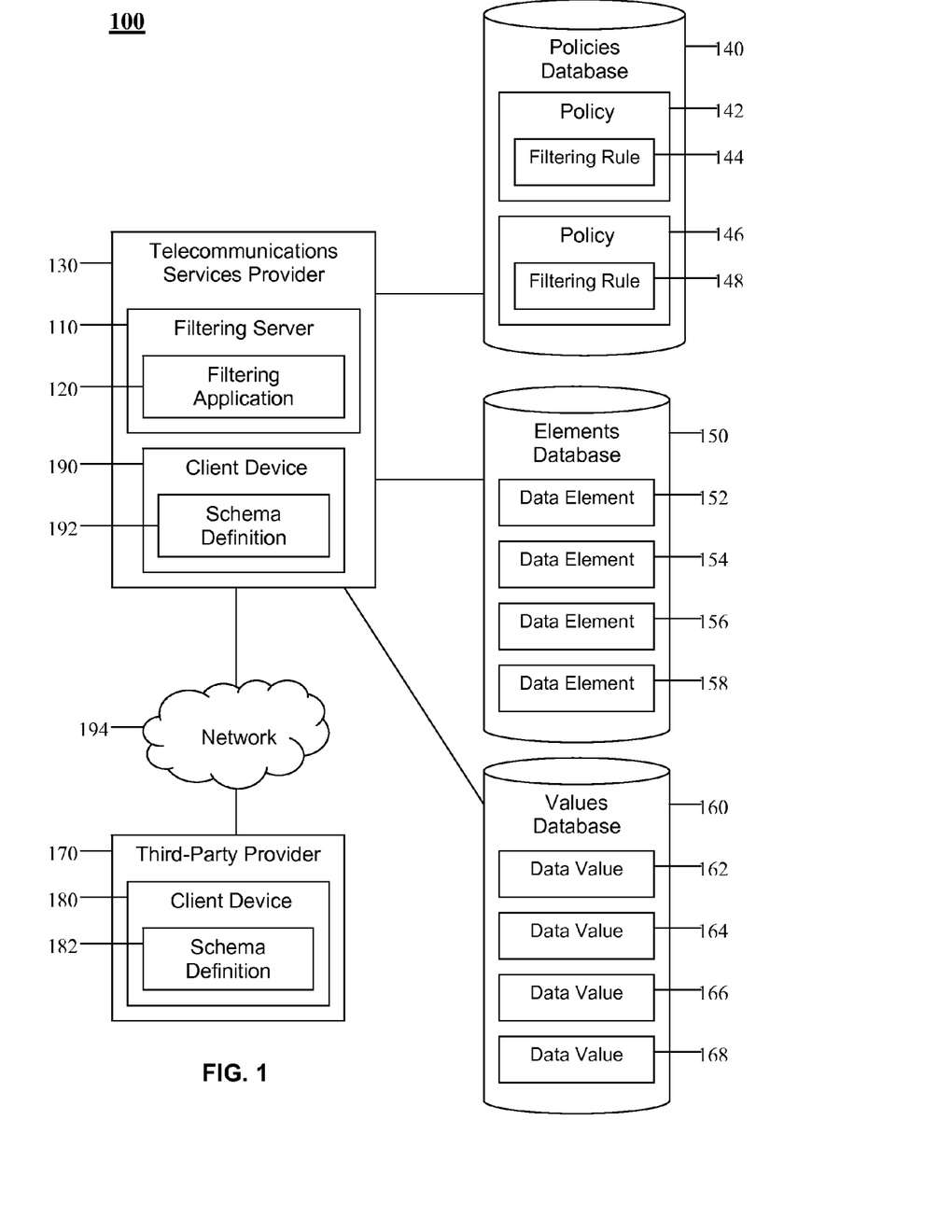
FIG. 1 is a block diagram of a system according to an embodiment of the disclosure.

Turning now to FIG. 1, a system 100 of dynamic schema filtering is provided. The system 100 comprises a filtering server 110, a filtering application 120, a telecommunications service provider 130, a policies database 140, an elements database 150, a values database 160, a third-party provider 170, client devices 180, 190, and a network 194.

The filtering server 110 is a computer system. Computer systems are described in detail hereinafter. The filtering application 120 executes on the filtering server 110 and receives requests for web services from client devices 180, 190. The filtering application 120 may consult at least one policy 142 stored in the policies database 140 that may permit the client device 180 to be provided data elements 152, 154 to access the desired web service. When permitted by the policy 142, the filtering application 120 may apply a filtering rule 144 to a large or encompassing body of data elements 152, 154, 156, 158 and their associated schema attributes. The filtering rule 144 effectively filters data elements 152, 154 out of the large body of data elements 152, 154, 156, 158 and transforms the large body of data elements 152, 154, 156, 158 to a limited group of data elements 152, 154 directed to the needs of the web services customer and in compliance with security policies of the provider of the web services. The filtering out of the data elements 156, 158 that are off limits to the client device 180 under the policy 142 yields the remaining set of data elements 152, 154. The client device 180 may be authorized to view and use the remaining set of data elements 152, 154 to request data values 162, 164, 166, 168 when accessing web services. The remaining set of data elements 152, 154 may be provided in a schema definition 182 published to the client device 180 that may be compliant with the web service definition language (WSDL). The published schema definition 182 designates and describes the data elements 152, 154 that the client device 180 is authorized to access when accessing a web service. The published schema definition 182 contains a description of the data elements 152, 154 that the client device 180 may be provided and may include limitations on how the data elements 152, 154 are to be used, for example the order in which they may be presented in a document. The description of the data elements 152, 154 in the schema definition 182 may comprise a name of data element 152, 154, such as customer name or account number, the data type of the data element 152, 154, field length, and other attributes.

The client device 180 may then periodically request data values 162, 164 associated with the data elements 152, 154 included in the schema definition 182 it has been granted. When the client device 180 requests data values 162, 164 under the schema definition 182, the client device 180 may include the schema definition 182, or a reference to it, in its request. As with the schema definition 182 when it was originally received, the schema definition 182 when the client device 180 furnishes it with its request for data values 162, 164 may be compliant with the web service definition language (WSDL). The client device 180 may build its own business or other applications using the schema definition 182. The business applications may contain software code that references the schema definition 182 and causes data values 162, 164 associated with the data elements 152, 154 described in the schema definition 182 to be accessed from the provider of web services. The client device 180 may construct a plurality of electronic documents containing all or a portion of the schema definition 182 wherein the documents are compliant with the web service definition language (WSDL). The client device 180 may then use the simple object access protocol (SOAP) to exchange these documents with a provider of web services to request data values 162, 164 associated with the data elements 152, 154 described in the schema definition 182 as well as conduct other web services transactions.

The present disclosure teaches that the data elements 152, 154, their supporting schema attributes, and the data values 162, 164 associated with data elements 152, 154 provided by the schema definition 182 may be confidential information. Access to a broad store of data elements 152, 154, 156, 158 and associated schema information, for example the elements database 150, may be protected by a plurality of policies 142, 146. The policies 142, 146 may be applied to individual customers or other parties using the client devices 180, 190 to request access to data elements 152, 154, 156, 158, associated schema information, and their data values 162, 164, 166, 168. In an embodiment, a single policy 142 may be applied to a group or class of requesting parties. In another embodiment, a custom policy 142 may be developed and applied to an individual customer or other party that may have specialized needs for web services. The filtering application 120 or another component may request the client device 180 to authenticate when it originally requests the web services that results in the creation of a new filtering rule 144. The client device 180 may also be requested to authenticate when accessing an existing filtering 144 rule based on the policy 142. The client device 180 may also be requested to authenticate when it provides a reference to a previously received schema definition 182 while requesting data values 162, 164 associated with data elements 152, 154 provided in the schema definition 182.

The present disclosure teaches the filtering or transformation of a large or encompassing web service definition language (WSDL) document associated with the elements database 150 containing a broad selection of data elements 152, 154, 156, 158 and supporting schema information to initially produce the schema definition 182 for the third-party provider 170 or internal party using the client device 190. The transformation is performed based on the filtering rule 144 applying a script or routine using the extensible stylesheet language transformations (XSLT) language. The filtering rule 144 conforms to the policy 142 applied by the web services provider to the third-party provider 170. Once the schema definition 182 is produced and provided to the third-party provider 170, the schema definition 182 and its components may be used repeatedly by the third-party provider 170 to request data values 162, 164 associated with data elements 152, 154 defined in the schema definition 182 as well as to perform other actions related to the accessed web services.

A large organization such as the telecommunications service provider 130 may be a web services provider and may maintain a voluminous and valuable store of information about customers. The telecommunications service provider 130 may be a provider of various wireless voice and data services to a plurality of different types of customers under various subscription arrangements. The records of the telecommunications service provider 130 may contain information such as customer names, addresses, account numbers, social security numbers, and credit histories. Because of some of the subscription arrangements the telecommunications service provider 130 has with its customers, records on file may also include additional information such as the names of the family members, their ages, and other information. Over extended relationships with various customers, the telecommunications service provider 130 may accumulate and store numerous items of information about customers, suppliers, distributors, and others. While this information may be treated as confidential to the public, the telecommunications service provider 130 may have the legal right to use this information in its business operations, for example the providing of web services, and may selectively release the information to some external and internal parties.

The telecommunications service provider 130 may accumulate the various categorizations of customer information and other information in the elements database 150 and may organize the data in categories that may be tagged and accessed for various purposes. The data may be categorized, stored, and manipulated using schema described by the extensible markup language (XML). The telecommunications service provider 130 may make the customer information available under business arrangements that provide the data using web services. The web services may be a software system designed to support interoperable machine-to-machine interaction over a network. The interactions described herein may be between the telecommunications service provider 130 and one of its distributors or other customers, for example the third-party provider 170, that may request the information under a contractual arrangement. The interactions described may also take place between the telecommunications service provider 130 and an internal customer, for example the user of the client device 190. The web services may be made accessible via an interface described in a processable format that may be the schema definition 182 and may be compliant with the web services description language (WSDL). The client device 180, that may be associated with the third-party provider 170, interacts with the web service in a manner prescribed by the web service and the schema definition 182 in messages that use the simple object access protocol (SOAP). The messages may be transmitted using hypertext transfer protocol (HTTP) with an extensible markup language (XML) serialization in conjunction with other web-related standards. Web services are typically accessed by a requesting component, for example the client device 180, accessing an application programming interface (API) made available by the provider of the web service, for example the telecommunications services provider 130. The application programming interface (API) may be associated with one or more documents compliant with the web service definition language (WSDL) that describe a broad plurality of data elements 152, 154, 156, 158 and supporting schema parameters. The document may be the extensible markup language (XML) description of a broad collection of data elements 152, 154, 156, 158 and supporting schema information that the telecommunications service provider 130 may not wish to be wholly accessible by typical web services customers.

The telecommunications service provider 130 may use an extensible markup language (XML) schema associated with the application programming interface (API) to describe representations of data elements 152, 154, 156, 158 that make up its large storehouse of customer or other information. A data element 152 may be customer name and a schema for the customer name data element 152 may comprise attributes such as first name, middle initial, and last name. Additional attributes of customer name may comprise data type and field length of data element 152, such as twenty alphabetic characters. A data element 152 is the description of the type of data the data element 152 contains, such as customer name. An associated schema attribute for the data element 152 may describe the conditions, requirements, or limitations under which the data element 152 is used in an extensible markup language (XML) document, for example a document compliant with the web service definition language (WSDL) that is used for transacting web services wherein transmissions take place using the simple object access protocol (SOAP).

The telecommunications service provider 130 maintains a plurality of data elements 152, 154, 156, 158 and supporting schema attributes in the elements database 150. The telecommunications service provider 130 selects one particular instance of schema attribute to describe the customer data element 152 in one usage situation and may use a different instance of schema attribute to describe the same customer data element 152 in a different usage situation. Given business arrangements with two different customers under separate contracts, the telecommunications service provider 130 may present the same customer data element 152 in different manners, for example one customer name including middle initial and the other customer name not including middle initial. The data elements 152, 154, 156, 158, for example, customer name, customer address, and customer telephone number, and the schema attributes, the parameters defining the allowed presentation of the data elements 152, 154, 156, 158, are provided together in the schema definition 182.

The telecommunications service provider 130 makes its stored data available via web services under a plurality of business arrangements. The telecommunications service provider 130 may contract out some of its service offerings to third-party providers 170 that need some of the stored data to perform the services. For example, the telecommunications service provider 130 may contract out its services associated with a family locator service offered as an additional paid feature under subscription arrangements for wireless voice and data services. The locator service enables a parent using a mobile device under subscription with the telecommunications service provider 130 to determine the physical location of a child also using a mobile device. While the locator service is made part of the overall wireless services offering of the telecommunications service provider 130, the service may be performed by the third-party provider 170. To provide this service to the telecommunications service provider 130 under a contractual arrangement, the third-party provider 170 requests certain information from the telecommunications service provider 130 related to subscription accounts. This information may be maintained confidentially by the telecommunications service provider 130. The third-party provider 170, to provide the locator service, may need the telephone numbers or other identifying information for the mobile devices used by the parent and the child, but likely does not need other information, for example the social security number of the parent. The telecommunications service provider 130 under its contract with the third-party provider 170 makes available on a continuing basis some, but not all, information about selected customers. In addition, from one month to the next, for example, the data elements 152, 154, 156, 158 for customers that the telecommunications service provider 130 makes available to the third-party provider 170 may change, as well as the listings of the customers themselves.

The third-party provider 170 obtains the data elements 152, 154, 156, 158 and their data values 162, 164, 166, 168 by accessing a web service from the telecommunications service provider 130. The third-party provider 170 does this by accessing an application programming interface (API) made available by the telecommunications service provider 130. In an embodiment, the telecommunications service provider 130 makes many or all of its data elements 152, 154, 156, 158 and supporting schema information accessible via one or a few application programming interfaces (API). The telecommunications service provider 130 may find it costly, unwieldy, or risky from a security perspective to maintain and make available a large plurality of application programming interfaces (API), each associated with various data elements 152, 154, 156, 158. Because a single large application programming interface (API), for example, may make available most or all of the data elements 152, 154, 156, 158 representing most or all of the customer data of the telecommunications service provider 130, the telecommunications service provider 130 likely does not want to make this information accessible to the third-party provider 170 or others without a specific need to know the information. The telecommunications service provider 130 potentially exposes itself to legal liability by not carefully guarding its customer information.

The present disclosure teaches the use of policies 142, 146 by the telecommunications service provider 130 to filter from the elements database 150 or file of data elements 152, 154, 156, 158 just the data elements 152, 154 needed by the third-party provider 170 or other requester to access the desired web service. The process taught herein applies at least one filtering rule 144 to a first plurality of data elements 152, 154, 156, 158 wherein the first plurality comprises many or all of the data elements 152, 154, 156, 158 the telecommunications service provider 130 may make available for all of its web services. The filtering rule 144 causes data elements 156, 158 that the third-party provider 170 is either not authorized to access or does not need to access to be separated from the data elements 152, 154 that the third-party provider 170 has contracted for in its arrangement with the telecommunications service provider 130. The data elements 156, 158 not needed by the third-party provider 170 are filtered out of the full group of data elements 152, 154, 156, 158, leaving behind the data elements 152, 154 needed by the third-party provider 170 for its business application.

The telecommunications service provider 130 may maintain a plurality of policies 142, 146 in the policies database 140. The policy 142 may apply to a plurality of third-party providers 170 with similar needs for data elements 152, 154 due to similarities in their business needs or due to general confidentiality policies of the telecommunications service provider 130. In an embodiment, the telecommunications service provider 130 develops a single policy 142 for an individual third-party provider 170 if this is economically justified and/or if the needs of the third-party provider 170 are highly specialized. The policy 142 is applied in the form of the filtering rule 144 that may be an application or routine created using the extensible stylesheet language transformations (XSLT) language. Each policy 142, 146 may be associated with an individual filtering rule 144, 148 or in some cases, an individual policy 142 may be associated with several filtering rules 144, 148. The extensible stylesheet language transformations (XSLT) language may be used for the transformation of extensible markup language (XML) documents. The original document is not changed; rather, a new document is created based on the content of the original document and the application of the filtering rule 144. The present disclosure teaches that the large or master document or elements database 140 that may contain most or all of the data elements 152, 154, 156, 158 of the telecommunications service provider 130 may be subjected to the filtering rule 144 associated with the policy 142 that is applied to the third-party provider 170. The master document or content listing of the elements database 150, that may be compliant with the web service definition language (WSDL), is not altered by the process, but a new document is created from the application of the filtering rule 144. The new document, that may also be compliant with web service definition language (WSDL), may contain the data elements 152, 154 needed by the third-party provider 170 to access web services, and when accompanied by schema attributes, comprises the schema definition 182 that the third-party provider 170 is provided and may use in accessing data values 162, 164 in connection with accessing web services.

The schema definition 182 may comprise the contracted arrangement deliverable between the telecommunications service provider 130 and the third-party provider 170 or other entity accessing the at least one web service. The schema definition 182 comprises a web service definition language (WSDL) compliant description of data elements 152, 154 and their supporting schema attributes. As discussed, a data element 152 may be customer name, and schema attributes may include data type, for example alphanumeric string, data field length, and syntactical attributes, such as a specification that the first letter of the customer name be presented in upper case. When the data element 152 is primarily numeric, for example a telephone number or a balance owing on an account, the data type may be integer or floating point. A syntactical attribute may specify that the data element 152 is required or optional. The schema definition 182 describes and provides details for each of the data elements 152, 154 which the client device 180 associated with the third-party provider 170 is allowed to access and to request associated data values 162, 164.

The third-party provider 170 may use the received schema definition 182 to construct electronic documents for use in periodically requesting data values 162, 164 associated with the data elements 152, 154 described in the schema definition 182. The electronic documents present the data elements 152, 154 in the manner described in the schema definition 182 complying with the web service definition language (WSDL) and transmitted using the simple object access protocol (SOAP). In its various accesses of web services with the telecommunications service provider 130, the third-party provider 170 may exchange a plurality of electronic documents that are compliant with the web service definition language (WSDL) and transmitted using simple object access protocol (SOAP). The third-party provider 170 may use the schema definition 182 to create bindings with development languages such as C++ and JAVA to develop application code that the third-party provider 170 uses in its business. The third-party provider 170 may use commercially available software tools to create these language bindings. For example, such a commercially available tool may be accessed by activating a uniform resource locator (URL) that may contact a server associated with the telecommunications service provider 130 and may designate a web service definition language (WSDL) compliant file indicating the schema definition 182 for the third-party provider 170. The commercially available tool may activate the uniform resource locator (URL), provide the schema definition 182 and authentication, and generate the application code desired by the third-party provider 170 using the language bindings, the data elements 152, 154, 156, 158 and the schema attributes described in the schema definition 182. This process may promote the third-party provider 170 to create a plurality of simple object access protocol (SOAP) documents that it may use in its business, including documents that access data values 162, 164 associated with data elements 152, 154 described in the schema definition 182.

The third-party provider 170 may, for example, periodically invoice the telecommunications service provider 130 or another entity for services performed in connection with the family locator service it provides under contract with the telecommunications service provider 130. The third-party provider 170 may need the account numbers for the wireless customers of the telecommunications service provider 130 for whom the third-party provider 170 performed family locator services in the previous thirty day period, for example. The third-party provider 170 may provide a previously-created electronic document for transmission using the simple object access protocol (SOAP) to the telecommunications service provider 130. The document may be compliant with the web service definition language (WSDL) and may designate the account number data element 152 and additional indication or instruction requesting account number data values 162, 164 for only those customers that accessed family locator services in the previous thirty days. The document may contain the schema definition 182 itself or may contain a reference to it.

When the telecommunications service provider 130 receives the request from the third-party provider 170 in the form of a simple object access protocol (SOAP) document, it may perform authentication and validation of the request. Authentication may comprise determining the access rights and privileges of the client device 180 associated with the third-party provider 170 furnishing the request. These steps may comprise applying authentication, authorization, and accounting (AAA) protocol procedures. For the hypertext transfer protocol (HTTP), two way secure sockets layer (SSL) client authentication may be invoked that involve the passage of X.509 client certificates. In an embodiment, authentication of requests for data values 162, 164 wherein a previously provided schema definition 182 is included in or referenced by the request may be completed by a component other than the filtering server 110.

Validation may involve comparing the schema definition 182 included in or referenced by the incoming simple object access protocol (SOAP) document from the third-party provider 170 with records retained by the telecommunications service provider 130. In an embodiment, validation may involve applying the filtering rule 142 that was originally applied when the third-party provider 170 first requested web services and the schema definition 182 was created. Validation may assure for the telecommunications service provider 130 that the data elements 152, 154 and associated schema attributes being requested by the third-party provider 170 in its electronic document delivered in a simple object access protocol (SOAP) transmission are in compliance with the schema definition 182 originally approved and provided under the policy 142 and its associated filtering rule 144.

In an embodiment, the policy 142 and by connection, its associated filtering rule 144, change subsequent to the last time the third-party provider 170 submitted a simple object access protocol (SOAP) document or other request for data values 162, 164. Validation comprises reexamining the policy 142 upon receipt of some or every request for data values 162, 164 to assure that the policy 142 has not changed in the interim such that the third-party provider 170 is no longer permitted to request data values 162, 164 or is required to do so in a modified manner. Changes to the policy 142 may not be specific to the third-party provider 170 and instead affect a plurality of or all customers of the telecommunications service provider 130, depending on the nature of events associated with the change to the policy 142. In an embodiment, the policy 142 is reviewed on a periodic basis and applied to some or all customers of the telecommunications service provider 130. When changes to the policy 142 or to the status of the third-party provider 170 occur such that the rights or privileges of the third-party provider 170 to access data values 162, 164 have been altered, suspended, or revoked, the telecommunications service provider 130 optionally notifies the third-party provider 170. The telecommunications service provider 130 provides this notice in advance of the third-party provider 170 submitting requests for data values 162, 164 as the third-party provider 170 is in an embodiment a valued customer of the telecommunications service provider 130.

If applicable, the telecommunications service provider 130 furnishes advice to the third-party provider 170 regarding addressing one or more problems associated with the non-compliance with the policy 142 by the third-party provider 170. In an embodiment, resolution of the problem entails building a new schema definition 182, 192 for the client devices 180, 190, respectively. This process potentially involves creating an entirely new filtering rule 144, 148 depending on the nature and magnitude of the change in policy 142 or change in status of the third-party provider 170. If the change in policy 142 or status of the third-party provider 170 is not comprehensive, resolution of the problem entails making one or several minor adjustments to the schema definition 182, providing the adjusted schema definition 182 to the third-party provider 170, and examining the simple object access protocol (SOAP) document of the third-party provider 170 when the third-party provider 170 subsequently requests data values 162, 164 to assure that the adjustments to the schema definition 182 have been provided for in the simple object access protocol (SOAP) document.

In an embodiment, changes to the policies 142, 146, respective filtering rules 144, 148, and the status of the third-party provider 170 do not occur and validation instead detects other problems. For example, validation detects of one or more procedural or syntactical error conditions that are resolved before the request by the third-party provider 170 for data values 162, 164 or other items is fulfilled. The simple object access protocol (SOAP) document submitted by the third-party provider 170 potentially contains syntax errors or requests a data value 162 associated with a data element 152 that does not exist or has been deleted or changed in some manner. In this event, an error message or other message is provided to the third-party provider 170 and the third-party provider 170 corrects its requesting simple object access protocol (SOAP) document and resubmits it.

Validation may also provide assurance to the third-party provider 170 that the data values 162, 164 and associated information it may be receiving in return for its request adhere closely to the schema definition 182. Integrity of returned data values 162, 164 from the telecommunications service provider 130 may be desired by the third-party provider 170 because the third-party provider 170 is using the data values 162, 164 in its electronic simple object access protocol (SOAP) documents that it may use in commercial activities with its own customers or other parties not connected with the telecommunications service provider 130. The validation allows the third-party provider 170 to rely on the telecommunications service provider 130 to provide the correct data values 162, 164 each time a request for data values 162, 164 and supporting information is furnished. The validated integrity of the schema definition 182 protects both the third-party provider 170 and the telecommunications service provider 130.

The present disclosure has characterized a requester and user of the schema definition 182 for web services as the third-party provider 170 that may be an entity separate from the telecommunications service provider 130, as described in the example depicting the provider of family locator services under contract with the telecommunications service provider 130. The third-party provider 170 needed only certain defined data elements 152, 154 from the telecommunications service provider 130 and the present disclosure teaches the application by the filtering application 120 of policies 142, 146 and their associated filtering rules 144, 148 to transform a large body of data elements 152, 154, 156, 158 and associated schema parameters to the limited schema definition 182 needed by the third-party provider 170.

In an embodiment, the third-party provider 170 may enter into an arrangement with the telecommunications service provider 130 or other provider of web services that may be characterized as "e-Bonding." E-Bonding may comprise direct communication with a customized software interface provided by the telecommunications service provider 130. The interface may enable the internal systems of the third-party provider 170 to generate service orders, order status checks, trouble reporting and inventory management transactions using all or portions of the previously received schema definition 182 and submitted as web service definition language (WSDL) compliant documents. These documents may be transmitted directly using simple object access protocol (SOAP) into the proprietary systems of the telecommunications service provider 130, for example the filtering server 110. This example of the use of the system and methods taught by the present disclosure may promote cost reduction for third-party provider 170 by reducing manual data entry and may expedite turnaround of data and service requests fulfilled by the telecommunications service provider 130.

In an embodiment, the party requesting web services that results in the creation of the schema definition 192 may be internal to the telecommunications service provider 130, for example an internal department that does not need full access to all data elements 152, 154, 156, 158 and their associated data values 162, 164, 166, 168. For privacy and security reasons, the telecommunications service provider 130 may wish to limit the accessibility and visibility of customer and other data even to internal users. The client device 190 may be used by an internal department or function within the telecommunications service provider 130 and may develop an application that needs to call an application programming interface (API) to access web services. In an embodiment, the filtering application 120 may provide an integration layer between two internal applications. The present disclosure teaches that the filtering application 120 may allow a plurality of application programming interfaces (API) to provide a similar look, format, and standards without undergoing costly changes that may additionally present security challenges.

While the provider of web services has been described herein as the telecommunications service provider 130, a plurality of types of organizations may be providers of web services. Such organizations may provide data elements 152, 154, 156, 158 and associated data values 162, 164, 166, 168 and may own or control the filtering server 110 or access the capabilities of the filtering server 110 under contract. The provider of web services may be a utility, a transportation company, a retailer, or an industrial company. The provider of web services may be a governmental entity, a non-profit organization, or a university or other educational provider.

The client device 180, 190 may be a desktop computer, a laptop computer, or a tablet computer. The client device 180, 190 may be a portable electronic device, for example a mobile telephone, a media player, or a personal digital assistant (PDA). While the client device 190 is depicted in FIG. 1 as being inside the telecommunications service provider 130 because it has been described as being associated with an internal user employed by the telecommunications service provider 130, in an embodiment, the client device 190 may be used by a contract worker to the telecommunications service provider 130.

The network 194 promotes communication between the components of the system 100. The network 194 may be any communication network including a public data network (PDN), a public switched telephone network (PSTN), a private network, and/or a combination.

In an embodiment, a web services architecture based on the representational state transfer (REST) style of software architecture may use the system and methods taught herein to provide web services to the third-party provider 170, the client device 190, or another requester of web services. The representational state transfer (REST) may use the web service definition language (WSDL) to describe simple object access protocol (SOAP) messaging using the hypertext transfer protocol (HTTP). The representational state transfer (REST) may alternatively be implemented as an abstraction on top of the simple object access protocol (SOAP) or may be created without using the simple object access protocol (SOAP).

Figure 2:
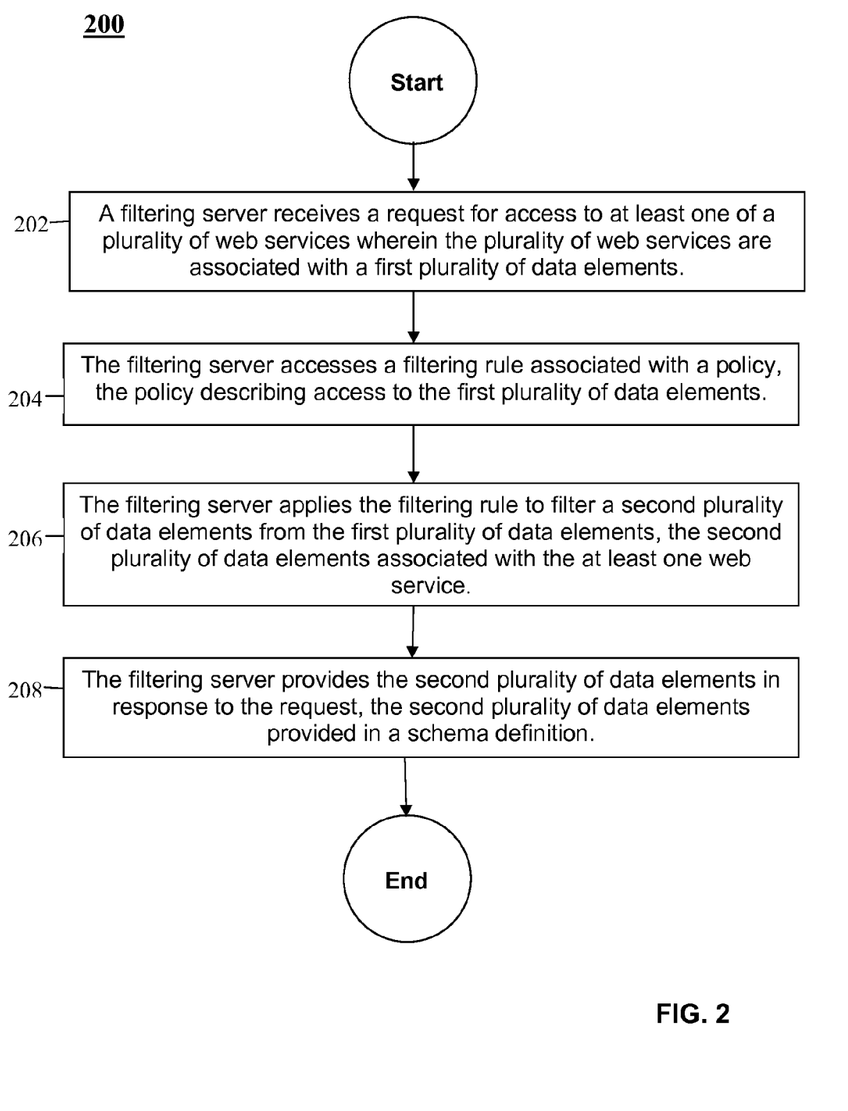
FIG. 2 is a flow chart illustrating a method according to an embodiment of the disclosure.

Turning now to FIG. 2, a method 200 is provided. Beginning at block 202, a filtering server receives a request for access to at least one of a plurality of web services wherein the plurality of web services are associated with a first plurality of data elements. At block 204, the filtering server accesses a filtering rule associated with a policy, the policy describing access to the first plurality of data elements.

At block 206, the filtering server applies the filtering rule to filter a second plurality of data elements from the first plurality of data elements, the second plurality of data elements associated with the at least one web service. At block 208, the filtering server provides the second plurality of data elements in response to the request, the second plurality of data elements provided in a schema definition.

Figure 3:
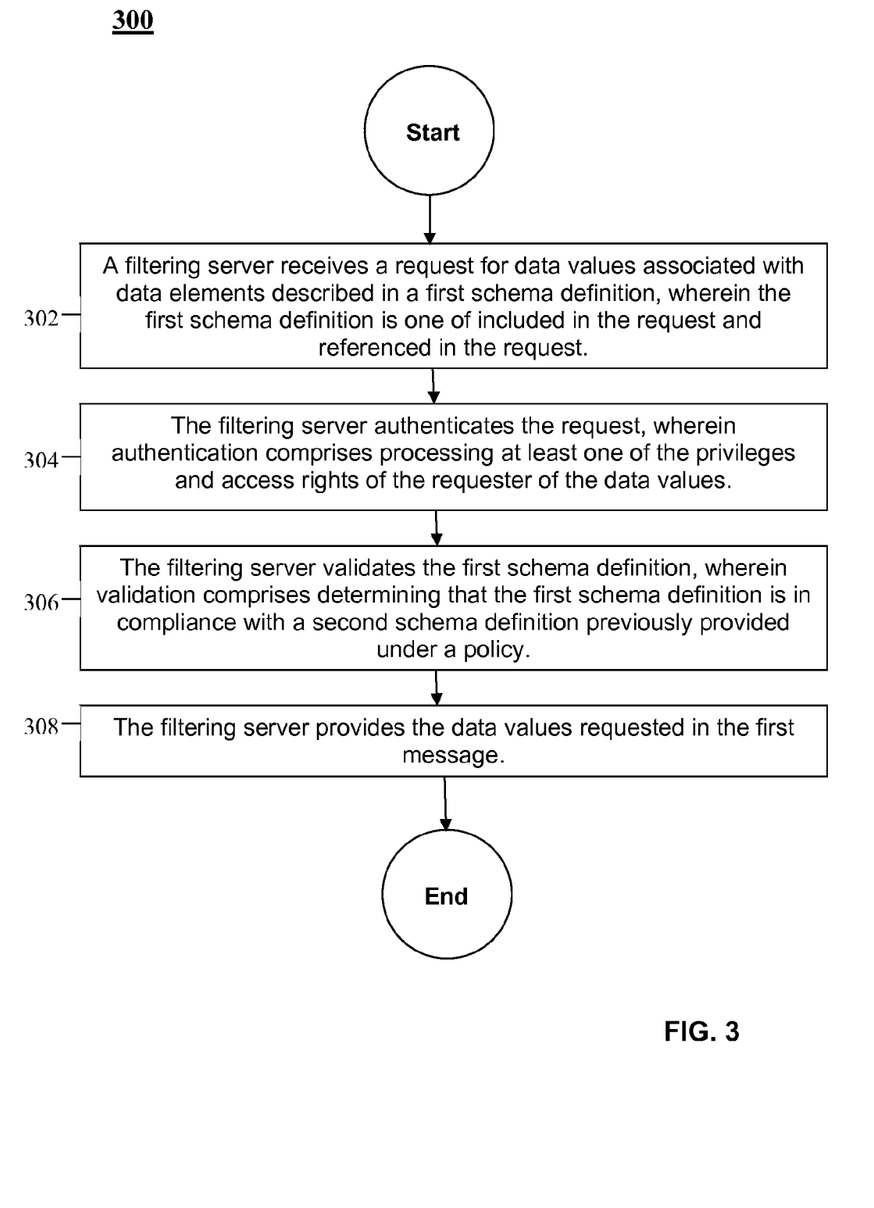
FIG. 3 is a flow chart illustrating a method according to an embodiment of the disclosure.

Turning now to FIG. 3, a method 300 is provided. Beginning at block 302, a filtering server receives a request for data values associated with data elements described in a first schema definition, wherein the first schema definition is one of included in the request and referenced in the request. At block 304, the filtering server authenticates the request, wherein authentication comprises processing at least one of the privileges and access rights of the requester of the data values.

At block 306, the filtering server validates the first schema definition, wherein validation comprises determining that the first schema definition is in compliance with a second schema definition previously provided under a policy. At block 308, the filtering server provides the data values requested in the first message.

Figure 4:
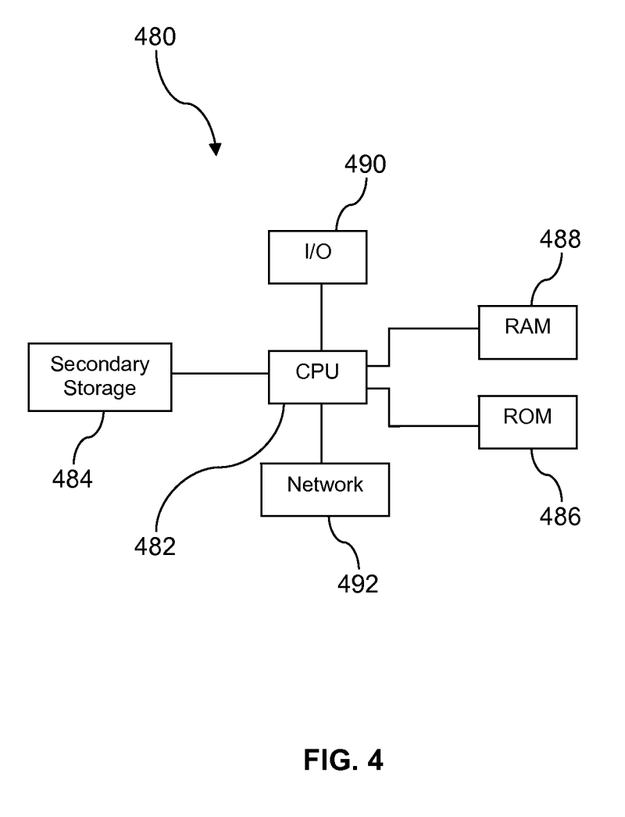
FIG. 4 illustrates an exemplary computer system suitable for implementing some aspects of the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data structures in part by directly accessing the computer program product, for example by reading from a CD-ROM disk inserted into a disk drive peripheral of the computer system 480. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

In some contexts, a baseband signal and/or a signal embodied in a carrier wave may be referred to as a transitory signal. In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer 480 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A schema filtering system, comprising:
   at least one processor;
   a memory; and
   an application stored in the memory that, when executed by the processor,
      accesses a policy associated with a web service in response to a first request from a client for access to the web service, wherein the web service is associated with a schema definition, wherein the schema definition comprises a broader plurality of data elements, and wherein each of the broader plurality of data elements is a description of a type of data which the corresponding data element contains,
      in response to receiving the first request, selects a confined plurality of data elements from the broader plurality of data elements based on the policy, wherein the confined plurality of data elements are at least one of data elements the client needs for the web service or data elements the client is permitted to receive for the web service, creates a customized schema definition for a client device associated with the client based on the policy associated with the web service and at least one security policy of a provider of the web service, wherein the customized schema definition designates the confined plurality of data elements the client device is allowed to access when accessing the web service and prevents the client device from accessing the broader plurality of data elements not included in the confined plurality of data elements when accessing the web service, provides the confined plurality of data elements to the client device in the customized schema definition, receives a second request from the client device using the customized schema definition for a set of data values associated with the confined plurality of data elements, authenticates the second request, validates the customized schema definition associated with the second request by comparing the customized schema definition associated with the second request to records retained by the provider of the web service, and provides the set of data values using the customized schema definition in response to the authentication of the second request and the validation of the customized schema definition associated with the second request.

2. The system of claim 1, wherein the customized schema definition describes at least one of a data type, a data field length, and a syntax for each of the confined plurality of data elements.

3. The system of claim 1, wherein the second request is compliant with web services description language (WSDL).

4. The system of claim 1, wherein the customized schema definition is configured to be used to create at least one electronic document for use in transactions with the provider of the web service.

5. The system of claim 1, wherein the application accessing the policy comprises selecting the policy from a plurality of policies.

6. A processor-implemented method for providing data elements to customers in customized schema definitions for web services, comprising:

receiving, by a filtering server, a first request for access to at least one web service from a client, wherein the at least one web service is associated with a schema definition, wherein the schema definition comprises a broader plurality of data elements, and wherein each of the broader plurality of data elements is a description of a type of data which the corresponding data element contains;

accessing, by the filtering server, a filtering rule associated with a policy, the policy describing access to the broader plurality of data elements;

in response to receiving the first request, applying, by the filtering server, the filtering rule to filter a confined plurality of data elements from the broader plurality of data elements, wherein the confined plurality of data elements are at least one of data elements the client needs for the at least one web service or data elements the client is permitted to receive for the at least one web service;

creating, by the filtering server, a customized schema definition for a client device associated with the client based on the policy associated with the at least one web service and at least one security policy of a provider of the at least one web service, wherein the customized schema definition designates the confined plurality of data elements the client device is allowed to access when accessing the at least one web service and prevents the client device from accessing the broader plurality of data elements not included in the confined plurality of data elements when accessing the at least one web service;

providing, by the filtering server, the confined plurality of data elements to the client device in response to the first request, the confined plurality of data elements provided in the customized schema definition receiving, by the filtering server, a second request from the client device using the customized schema definition for a set of data values associated with the confined plurality of data elements;

authenticating, by the filtering server, the second request;

validating, by the filtering server, the customized schema definition associated with the second request by comparing the customized schema definition associated with the second request to records retained by the provider of the at least one web service; and providing, by the filtering server, the set of data values using the customized schema definition in response to the authentication of the second request and the validation of the customized schema definition associated with the second request.

7. The method of claim 6, wherein the second request comprises at least one electronic document based on the customized schema definition.

8. The method of claim 7, wherein the at least one electronic document is used to request data values associated with the confined plurality of data elements, and wherein the at least one electronic document is transmitted using the simple object access protocol (SOAP).

9. The method of claim 6, wherein the filtering rule is applied using an extensible stylesheet language transformations (XSLT) language.

10. The method of claim 6, wherein the filtering rule excludes data elements from the confined plurality of data elements that a requester of access to web services at least one of is not permitted to receive under the policy and does not need to access the at least one web service.

11. The method of claim 6, wherein the application of the filtering rule is additionally associated with access rights of a requester of the at least one web service.

12. The method of claim 6, wherein access to the at least one web service is associated with at least one application programming interface (API).

13. The method of claim 6, wherein the customized schema definition is used to generate language bindings for use when processing data values associated with the confined plurality of data elements.

14. A processor-implemented method for providing data values associated with data elements that are described in customized schema definitions for web services, comprising:

creates, by a filtering server, an original customized schema definition based on a policy associated with a web service and at least one security policy of a provider of the web service, wherein the web service is associated with a schema definition, wherein the schema definition comprises a broader plurality of data elements, and wherein each of the broader plurality of data elements is a description of a type of data which the corresponding data element contains;

receiving, by the filtering server, a request from a client device associated with a client for data values associated with a plurality of confined data elements of the plurality of broader data elements described in a subsequent customized schema definition, wherein the subsequent customized schema definition is included in the request or referenced in the request, constructed for the client, and in compliance with the original customized schema definition, designates the confined plurality of data elements the client is allowed to access when accessing the web service, and prevents the client device from accessing the broader plurality of data elements not included in the confined plurality of data elements when accessing the web service, and wherein the confined plurality of data elements are data elements the client device needs for the web service or data elements the client device is permitted to receive for the web service;

authenticating, by the filtering server, the request, wherein authentication comprises processing at least one of privileges and access rights to the data values;

validating, by the filtering server, the subsequent customized schema definition by comparing the subsequent customized schema definition to records retained by the provider of the web service, wherein validation comprises determining that the subsequent customized schema definition is in compliance with the original customized schema definition; and providing, by the filtering server, the data values requested in the request in response to the authentication of the request and the validation of the subsequent customized schema definition.

15. The method of claim 14, wherein the request complies with a web services description language (WSDL) associated with the web service.

16. The method of claim 14, wherein the request comprises a uniform resource locator (URL).

17. The method of claim 14, further comprising transmitting, by the filtering server, a plurality of electronic documents using the simple object access protocol (SOAP), wherein the electronic documents contain the data values associated with the plurality of confined data elements.

18. The method of claim 14, wherein authentication additionally comprises applying a filtering rule used to create the original customized schema definition.

* * * * *